Dec. 29, 1931. E. C. HOGE Re. 18,304

ROOF AND FLOOR CONSTRUCTION

Original Filed Feb. 19, 1924

INVENTOR.
Edward Clyde Hoge

BY

Allen Allen

ATTORNEYS

Reissued Dec. 29, 1931

Re. 18,304

UNITED STATES PATENT OFFICE

EDWARD CLYDE HOGE, OF CINCINNATI, OHIO, ASSIGNOR TO LATHROP-HOGE CONSTRUCTION COMPANY, OF CINCINNATI, OHIO, A PARTNERSHIP COMPOSED OF JAY C. LATHROP AND EDWARD CLYDE HOGE

ROOF AND FLOOR CONSTRUCTION

Original No. 1,814,387, dated July 14, 1931, Serial No. 693,884, filed February 19, 1924. Application for reissue filed November 6, 1931. Serial No. 573,487.

My invention relates to construction of roofs and floors of monolithic character, particularly where poured from gypsum plaster, or like light weight ceramic product.

In my Patent No. 1,464,711, dated August 4th, 1923, I show and describe a floor and roof construction wherein a sheet of composition board is employed as a permanent under support for the poured cementitious body of the roof or floor, said plaster board being mounted on the bases of metal rails.

It is my object in the present invention to obtain like advantages in metallic reinforcement and support of a poured gypsum plaster construction, but to use a removable form as a support. The structure made according to the new invention, has greater depth than the first form devised by me, as set forth in said patent, and in addition the rails are or may be entirely enclosed in a body of plaster, while the reinforcing arch of wire mesh, rods or expanded metal that is supported across the rails is deeper in its supporting arch. The removable supports are not destroyed with use, and can be used over again, and in avoiding the use of plaster board, I eliminate the necessity of care and attention in handling of this form of floor and roof support. That is to say, there is eliminated the chance of breakage of the composition board, since the use of the same is done away with, without any disadvantageous results.

I accomplish my objects, which generally speaking are the advantageous features of my former invention, applied to other than a composition board supported structure, by that certain construction and arrangement of parts to be hereinafter more specifically pointed out and claimed.

Figure 1:
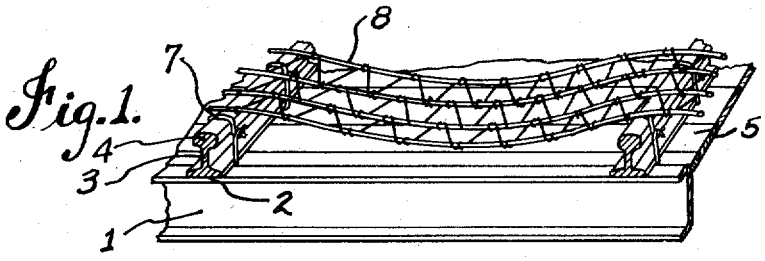
Figure 1 is a perspective of the form work for my new structure.
Figure 2:
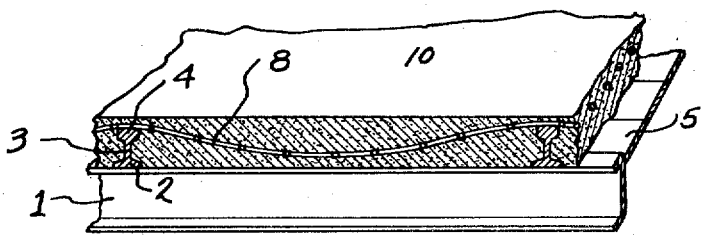
Figure 2 is a like view of the poured slab.

Referring to the illustrated embodiment of my invention, 1 are the channels of a building, typifying whatever structural metal girders, beams or trusses that may be used in the roof or floor.

Mounted crosswise of the extent of the beams 1 are rails, spaced in proportion to the load to be borne by the floor or roof, and having bases 2, webs 3 and balls or tops 4.

The forms are built up of desired material, in convenient length. Thus in one embodiment, I use six inch planks 5, nailed together by means of battens 6, which battens are arranged in spacing, as the rails are spaced. The planks are in number enough to span the space between the beams or trusses, or else the planks may be built up, as has been my practice in boards of three planks each battened together, sufficient boards being used to span the beams.

Whatever form of support is used, the forms are suspended from the rails by means of suitable ties, such as wire ties 7, and the space between the structural beams is closed off, so as to permit of supporting the poured cement.

If boards made up of planks and battens are used, the battens are set beneath the rails and holes bored in the planks through which the wire ties may pass, so that the wires pass around the battens.

When the forms are set up, the next step is to lay in the mesh. This is done by looping some suitable open-work metal structure crosswise of the rails. As an illustration, I have shown partially diagrammatically, the wire mesh 8.

This metal structure of rails running one way of the beams, and wire mesh in arches transverse the rails, gives excellent support, and the use of rails is preferred for one reason, because the tops or balls are rounded and do not tend to shear the wire mesh, when subjected to strain.

Furthermore the use of the rail form of cross support is preferred because of the double channel form, providing for a keying in of the poured plaster or cement body.

Figure 3:
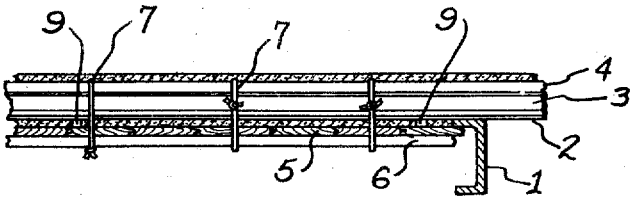
Figure 3 is a cross section of the poured slab before the under form is removed.

I prefer to further increase the keying in, by so arranging the ties, for the forms, that they are suspended below the rails. In Figure 3 I have illustrated small blocks 9 set beneath the rails to steady the forms, when same are suspended below the rails.

The cement 10, which preferably will be of gypsum plaster, because of its light weight, is poured into the form so built up, and will flow entirely around the rails, being held by the suspended under forms. Preferably the slab should come above the tops of the rails to thoroughly embed the mesh.

When the structure is poured the lower forms are removed by cutting the wire lying beneath the battens, whereupon the forms will drop away.

In building the roof or floor, the operators can walk about more freely where the under form is removable, as compared to the instance in which plaster board is mounted on the bases of the rails, since there is no danger of stepping onto the under forms, and no likelihood of breakage of the under forms. Also many prefer a ceiling which does not show the plaster board forms interspaced by the rails.

The rails lie direct on the beams or trusses, and the wire mesh forms deep arches in support across the rails, so that to a very large degree there is no strain left on the poured plaster element of the slab.

Having thus described one illustrative embodiment of my invention, what I claim as new and desire to secure by Letters Patent, is:—

1. A roof or floor structure comprising in combination with interspaced girders, interspaced supporting bars disposed crosswise on the girders and mounted thereon, with rounded upper portions, reinforcing metal disposed across between the bars, said metal disposed over the rounded upper portions of the bars and extending in concave arch formations between the bars, and poured cementitious material enclosing the reinforcing metal and forming with respect to the lower surfaces of the interspaced bars an unbroken under surface for the structure.

2. A roof or floor structure comprising in combination with interspaced girders, interspaced supporting bars disposed crosswise on the girders and mounted thereon, with rounded upper portions, reinforcing metal disposed across between the bars, said metal disposed on, but not secured to the bars, and said metal extending loosely in concave arch formations between the bars, and poured cementitious material completely enclosing the bars and forming with respect to the lower surfaces of the interspaced bars an unbroken under surface for the structure.

EDWARD CLYDE HOGE.